United States Patent Office 3,441,597
Patented Apr. 29, 1969

3,441,597
PROCESS FOR THE PREPARATION OF METHYL
AND ETHYL ACETOACETATE
Otto Probst and Lothar Hörnig, Frankfurt am Main, and Lothar Hirsch, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed July 18, 1966, Ser. No. 565,679
Claims priority, application Germany, July 24, 1965,
F 46,706
Int. Cl. C07c 67/00, 69/72
U.S. Cl. 260—483                    3 Claims

ABSTRACT OF THE DISCLOSURE

An improved method for preparation of methyl and ethyl acetoacetate has been provided whereby a diketene is reacted with methanol or ethanol in presence of a specific tertiary amine catalyst, the improvement residing in carrying out the process at a pressure within the range of 0.4 to 6 atmospheres gage.

---

The present invention relates to a process for the preparation of methyl and ethyl acetoacetate.

It is known that alcohols may be reacted with diketene in the presence of basic catalysts to give acetoacetate esters. In addition to basic salts such as sodium acetate, sodium phosphate, borax, etc., tertiary amines, such as triethylamine, pyridine and triethanolamine have been suggested as catalysts.

However, when using this method of operation for the technical scale production of methyl acetoacetate or ethyl acetoacetate, significant disadvantages are revealed. Thus when using the basic salts as catalysts, the yield is only satisfactory if acetic acid or another carboxylic acid is added simultaneously. This acid, however, has to be distilled off again when working-up the crude mixture containing the acetoacetate ester. Better yields are obtained by the known method of working if tertiary amines are used as catalysts. Here, however, it has proved that by no means all tertiary amines give good yields. Thus for example the yields of methyl acetoacetate obtained are only 23 percent with tribenzylamine, only 24 percent with N,N-dimethyl-α-naphthylamine, only 36 percent with N,N,N',N'-tetramethyl-methylene diamine, and only 66 percent with triethanolamine.

A group of tertiary amines such as trimethylamine, triethylamine and pyridine further have the very disadvantageous property of forming, in each case, a maximum boiling azeotrope, having a boiling point close to the boiling points of methyl or ethyl acetoacetate, with acetic acid, of which larger amounts are present in the crude ester mixture particularly if technical grade diketene has been used. This renders the technical scale working-up of the crude ester mixture considerably more difficult.

It has also already been suggested to add a strong acid, e.g. sulphuric acid or phosphoric acid, to the crude ester mixture before distillation, in order to bind the tertiary amine by salt formation. However, it has been found that if an equivalent amount of acid is used, salt formation is incomplete in the nonaqueous medium present. If on the other hand an excess of acid is used, the stability of the acetoacetate ester is affected and considerable amounts of ester are destroyed during distillation.

It is the object of U.S. patent application S.N. 466,114, filed on June 22, 1965 in the name of Probst et al. for "Process for the Manufacture of Acetoacetic Acid Methyl Ester and Acetoacetic Acid Ethyl Ester" to react methanol and ethanol respectively with diketene to yield methyl and ethyl acetoacetate in the presence of a tertiary amine of the formula

as a catalyst, in which formula $R_1$ and $R_2$ denote identical or different alkyl groups having 1–3 carbon atoms, and these alkyl groups may also be connected via a carbon, oxygen or nitrogen atom to form a 5- or 6-membered ring, and Z represents an optionally olefinically unsaturated alkyl or cycloalkyl group having at least 8 carbon atoms, preferably 8–18 carbon atoms, or represents the group $—(CH_2)_n—X$ in which $n$ is an integer greater than 1, preferably from 2 to 10, and X is a hydroxyl, sulphhydryl or optionally mono- or di-substituted amine group.

$R_1$ and $R_2$ are preferably methyl, ethyl, propyl or isopropyl groups. The group $—(CH_2)_n—$ may also be substituted by alkyl groups, i.e. it may have a branched carbon backbone. Where X denotes a mono- or di-substituted amino group, various hydrocarbon groups, but particularly low alkyl groups, are to be considered as substituents. A heterocyclic secondary amine group, for example a pyrrolidyl or piperidyl group may also be present as the di-substituted amino group.

Particularly pure methyl or ethyl acetoacetate are obtained if the boiling point of the tertiary amine used as the catalyst according to the invention is, at normal pressure, at least 20° C. higher than that of the methyl or ethyl acetoacetate. If in the above formula the group $(CH_2)_n—X$ and X denote a hydroxyl, sulphhydryl, amino or monosubstituted amino group, i.e. if X has a mobile hydrogen atom, the catalyst is acylated by the diketene. It is advantageous that this acyl compound should also boil at least 20° C. higher than the desired methyl acetoacetate or ethyl acetoacetate. This thus brings the advantage of the whole of the catalyst remaining in the sump phase on distillation of the reaction mixture at the end of the reaction.

Suitable catalysts are, inter alia, N,N-dimethyl-octylamine, N,N-diethyl-dodecylamine, N,N-dimethyl-stearylamine, N,N-dimethyl-oleylamine, N,N-dimethyl-ethanolamine, N,N-dipropyl-ethylenediamine, N,N-diisopropyl-N'-methyl-ethylenediamine, N,N - diethyl-N'-phenyl-trimethylene-diamine, N,N,N',N' - tetramethyl-hexamethylenediamine, N,N,N' - triethyl-N' - octyl-tetramethylenediamine, N-dodecylpiperidine, N-octyl-morpholine. Mixtures of these amines may also be used.

Now we have found a process for the preparation of acetoacetic esters by reacting diketene with methanol or ethanol in the presence of 0.03 to 10 percent, calculated on the weight of said alcohol, of at least one tertiary amine of the formula

wherein $R_1$ and $R_2$ represent alkyl radicals having from 1 to 3 carbon atoms and $R_1$ and $R_2$ in combined form represent the remainder of a 5- to 6-membered carbocyclic or heterocyclic ring, oxygen or nitrogen being the sole hetero atom in said heterocyclic ring, and Z represents an alkyl, cycloalkyl, alkenyl or cycloalkenyl radical with 8 to 18 carbon atoms, or the group $—(CH_2)_n—X$, wherein $n$ is a whole number of at least 2 and X is the hydroxyl group, the sulfhydryl group, the amino group, the mono-substituted amino group or the disubstituted amino group, which comprises carrying out the process at a pressure within the range of from 0.5 to 6 atmospheres gage. The pressure is advantageously adjusted in such a manner that the reaction temperature is higher than the boiling point of the respective alcohol under 760 mm. Hg pressure, but is below 120° C. preferably within the range of from 90° to 105° C.

Different possibilities exist for applying the process according to the present invention. For example, the alcohol into which the catalyst has been mixed, and the diketene can be fed to a suitable reaction vessel, for example to the head of a column, and the finished crude ester can be continuously removed from the sump of the column. However, it is also possible to introduce, for example, alcohol and catalyst into a stirred kettle or an apparatus in which the reaction mixture is circulated by pumping, the diketene being allowed to run in. It is in each case advantageous to apply the alcohol in a stoichiometric excess amount.

When using the process of the present invention, the following advantages are gained:

Although the same high yield is obtained, the reaction proceeds more rapidly, which results in a higher throughout per unit of volume of the reaction space. Moreover, a lesser amount of catalyst is required, preferably only 0.05 to 1 percent, calculated on the methanol or ethanol applied.

It is advantageous, moreover, that part of the reaction heat remains in the product at latent heat and can be used, after the pressure has been released, for distilling off the low-boiling components of the crude product (methyl- or ethyl acetate, methanol or ethanol and acetone).

The following examples serve to illustrate the invention, but they are not intended to limit it thereto:

Example 1

A cylindrical vessel (capacity: 6 liters) equipped with a dephlegmator was supplied, per hour, at the head with 1540 grams of technical diketene (content of diketene: 75%), and at the center with a mixture of 560 grams methanol and 2 grams dimethyl stearylamine, the reaction vessel being kept under the constant pressure of 1.5 atmospheres gage. The mixture was maintained at the boil by means of the reaction heat; the temperature in the reaction vessen was 93° C. The finished crude ester, which contained no more diketene, was continuously removed at the bottom of the vessel and introduced, after the pressure had been released, at the centre of a short column. 985 grams of methyl acetoacetate (which represents 95.2% of the theoretical yield) was obtained from the sump product of the column by fractional distillation from 1000 grams, respectively, of the diketene used. The total distillate was free of amine.

Example 2

The same apparatus as that described in Example 1 was supplied, per hour, with 1400 grams of technical diketene (content of diketene: 88%) and with a mixture of 800 grams ethanol and 1 gram n-octadecyl-pyrrolidine, the reaction vessel being kept under the constant pressure of 0.8 atmosphere gage. The mixture was maintained at the boil by means of the reaction heat, the temperature in the reactor being 97° C. The finished crude ester which contained no more diketene was removed continuously at the bottom of the vessel and introduced, after the pressure had been released, at the center of a short column. 1290 grams ethyl acetoacetate (which represents 94.6% of the theoretical yield) was obtained from the sump product of the column by fractional distillation from 1000 grams, respectively, of the diketene used. The distillate was free of amine.

We claim:

1. In the process for the preparation of acetoacetic esters by reacting diketene at a temperature below 120° C. with methanol or ethanol in the presence of 0.03 to 10 percent, calculated on the weight of said alcohol, of at least one tertiary amine of the formula

wherein $R_1$ and $R_2$ represent alkyl radicals having from 1 to 3 carbon atoms and $R_1$ and $R_2$ may be connected by a carbon, oxygen or nitrogen atom to form a 5- to 6-membered heterocyclic ring, and Z represents an alkyl, cycloalkyl, alkenyl or cycloalkenyl radical with 8 to 18 carbon atoms, or the group $-(CH_2)_n-X$, wherein $n$ is a whole number of at least 2 and X is the hydroxyl group, the sulfhydryl group, the amino group, a mono-substituted amino group having as a substituent a lower alkyl radical or a disubstituted amino group having as a substituent a lower alkyl, a pyrrolidyl, or a piperidyl radical, the improvement which comprises carrying out the process at a pressure within the range of 0.5 to 6 atmospheres gage.

2. The process of claim 1, wherein the temperature in the reaction zone is maintained above the 760 mm. Hg pressure boiling point of the alcohol and within the range of from 90° C. to 105° C.

3. The process of claim 1 wherein 0.1 to 4 percent of said catalyst is used.

References Cited

UNITED STATES PATENTS 2,351,366   6/1944   Pohl et al. _____ 260—483

JAMES A. PATTEN, Primary Examiner.

V. GARNER, Assistant Examiner.